United States Patent

Oshino et al.

[11] Patent Number: 5,407,081
[45] Date of Patent: Apr. 18, 1995

[54] STACKER HAVING A CLASSIFYING BULLET TO SHIFT DELIVERED SHEET

[75] Inventors: Genzi Oshino; Hideaki Matsuda; Katsuhiko Obata, all of Miyagi, Japan

[73] Assignee: Tohoku Ricoh Co., Ltd., Shibata, Japan

[21] Appl. No.: 220,934

[22] Filed: Mar. 31, 1994

Related U.S. Application Data

[63] Continuation of Ser. No. 970,131, Nov. 2, 1992, abandoned.

[30] Foreign Application Priority Data

Nov. 2, 1991 [JP] Japan .................. 3-288147

[51] Int. Cl.⁶ .................. B07C 5/02; B07C 5/36
[52] U.S. Cl. .................. 209/538; 209/583; 209/606; 209/653; 271/184; 271/314; 414/791.2; 270/95
[58] Field of Search .............. 209/538, 583, 606, 652, 209/653; 271/81, 212, 213, 184, 185, 273, 274, 285, 286, 189, 225, 314; 414/791.2; 270/95

[56] References Cited

U.S. PATENT DOCUMENTS

| | | | |
|---|---|---|---|
| 3,578,159 | 5/1971 | Lindquist et al. | 209/583 X |
| 3,791,516 | 2/1974 | Tramposch | 209/583 X |
| 4,117,314 | 9/1978 | Schisselbauer et al. | 271/218 X |
| 4,635,920 | 1/1987 | Kodama | 271/184 X |
| 4,718,657 | 1/1988 | Otter et al. | 271/184 |
| 4,730,822 | 3/1988 | Wagner | 270/95 |
| 4,861,213 | 8/1989 | Fuchs | 271/185 X |
| 4,905,979 | 3/1990 | Limbach et al. | 271/189 X |
| 5,088,721 | 2/1992 | Suzuki et al. | 271/286 X |

FOREIGN PATENT DOCUMENTS

| | | | |
|---|---|---|---|
| 2757341 | 6/1978 | Germany | 209/583 |
| 63-24473 | 5/1988 | Japan . | |
| 8401934 | 5/1984 | WIPO | 271/285 |

*Primary Examiner*—Robert P. Olszewski
*Assistant Examiner*—Boris Milef
*Attorney, Agent, or Firm*—Armstrong, Westerman, Hattori, McLeland & Naughton

[57] ABSTRACT

A stacker has a feed unit for feeding separate sheets in a direction, a stacking unit for stacking the separate sheets in a normal position, and a sheet classifying mechanism for shifting a sheet into a position different from the normal position, upstream of the stacking unit with respect to the direction. Sheets to be used to classify respective batches of sheets stacked by the stacking unit can selectively be shifted into the position different from the normal position by the sheet classifying mechanism. Since those shifted sheets can easily and clearly be recognized by the operator, the batches of stacked sheet can be sorted out with ease. The sheets remain sightly in appearance as no classifying ink mark is applied to those sheets used to classify the batches of stacked sheets. If a bar code printed on a sheet is found defective as a result of a verification process, it may be either shifted into the position different from the normal position or rejected so that it will not be stacked by the stacking unit.

6 Claims, 10 Drawing Sheets

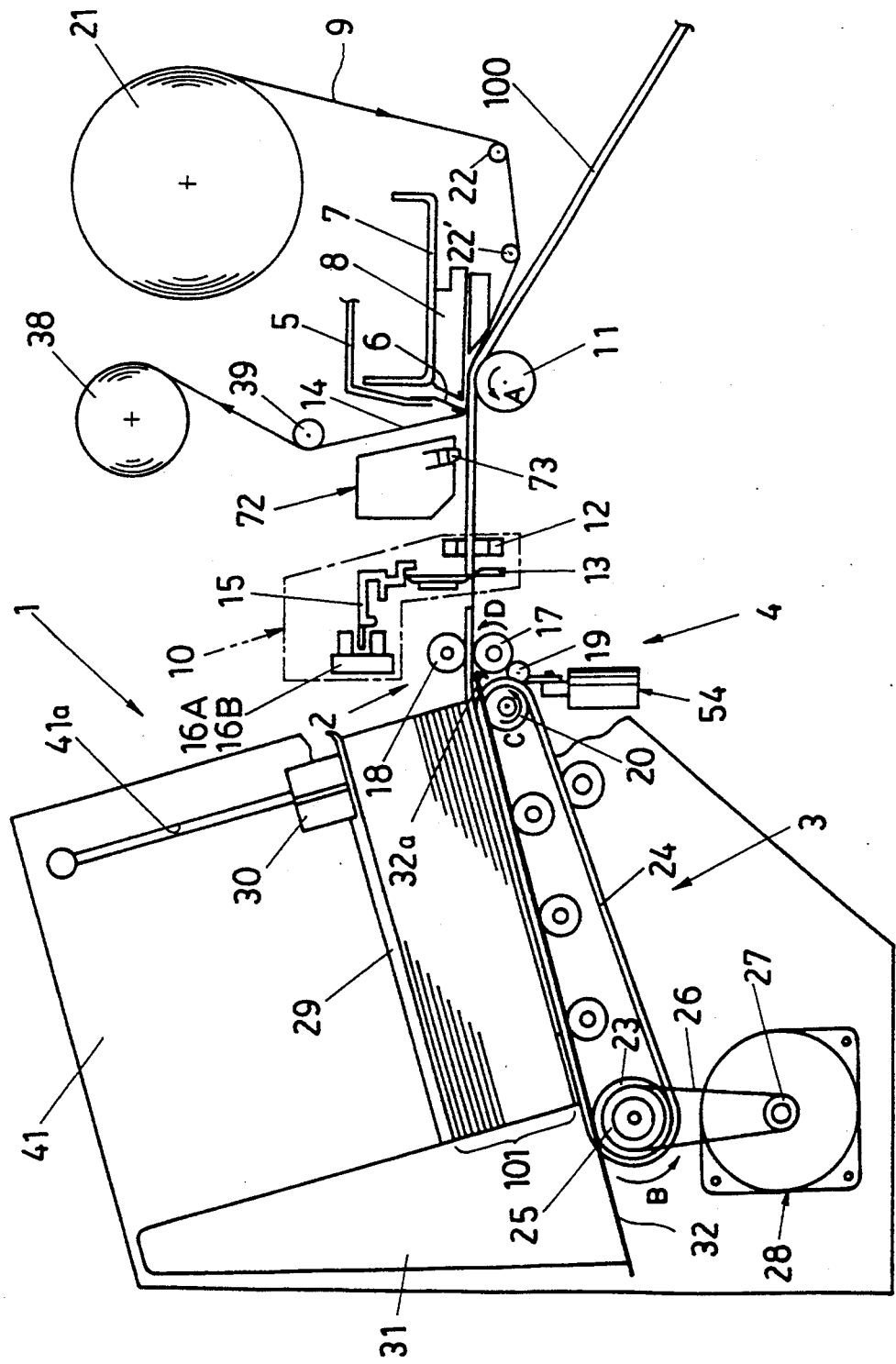

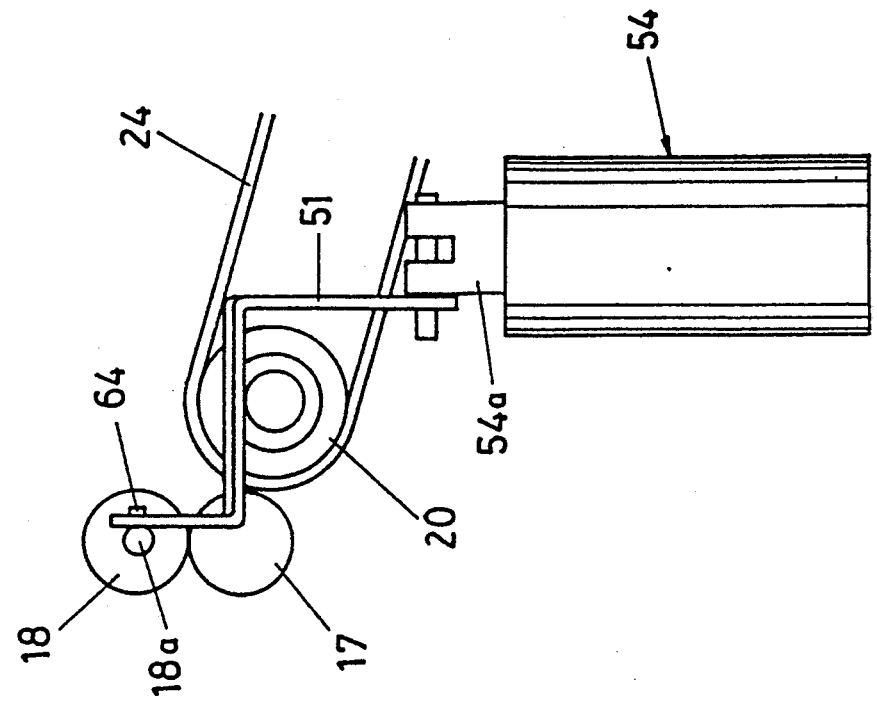
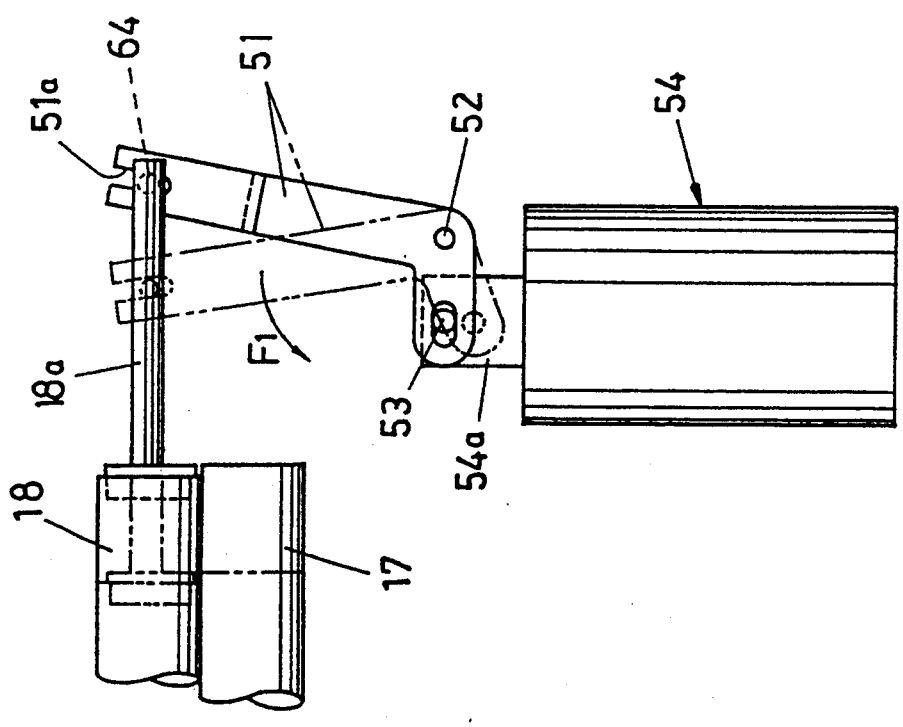

STACKER HAVING A CLASSIFYING BULLET TO SHIFT DELIVERED SHEET

This application is a continuation of application Ser. No. 07/970,131, filed Nov. 2, 1992, now abandoned.

FIELD OF THE INVENTION

The present invention relates to a stacker for stacking separate sheets of paper, which may be existing sheets of paper or successively cut from a continuous length of paper, the stacker being designed for use with a bar code printer, a successive price tag printer, a ticket dispenser, a card dispenser, a bar code sheet reader, or the like.

DESCRIPTION OF THE PRIOR ART

Successive price tag printers feed a continuous length of relatively thick paper from a supply roller to a printing mechanism which prints prices and necessary information on successive sections of the paper, each corresponding to a price tag. After having been printed, the successive printed sections of the continuous length of paper are cut into respective price tags, which are then delivered to a stacker where they are successively stacked.

The prices and other information to be printed often vary from one batch of price tags to another, depending on the kind of commodities to which price tags are to be attached. When a number of printed price tags are stacked on a stacker with the printed information varying from one group of price tags to another, the different groups of printed price tags can easily be sorted out subsequently if they are readily recognizable.

Various efforts have heretofore been proposed to identify the different groups of printed price tags. According to one proposal, one side edge of a printed continuous length of paper is marked with some form of information which indicates changes in the printed information. After the printed continuous length of paper is cut off into price tags, the marked price tags serve to distinguish the different groups of printed price tags from each other.

For example, Japanese Patent Publication No. 63-24473 discloses a successive price tag printer having a printing mechanism, a sheet cutter, and an ink applicator which is positioned between the printing mechanism and the sheet cutter. Each time printed information on a continuous sheet of paper changes, the ink applicator brings an ink-carrying roller into contact with one side edge of the sheet to apply a classifying ink mark of certain length where a change in the printed information occurs.

The printed continuous sheet of paper is cut off into a number of price tags, and the price tags are stacked on a stacker. Therefore, the stacked price tags include those price tags which are marked on their side edges, indicating positions where the printed information varies. Since the classifying ink marks are applied to the side edges of those price tags, they can be visually confirmed on one side of the stack of price tags, making it easy for the operator to recognize and divide the price tags into groups each bearing a different price and different information.

One problem with the proposed successive price tag printer is that the classifying ink marks, which do not form essential part of the price tags, would make the price tags unsightly especially when the price tags are used on expensive goods. Therefore, it has been customary to throw away those marked price tags, wasting the paper material.

Generally, printers of the type discussed above include a platen roller and a print head which are often supported in a cantilevered fashion to facilitate replacement of ink ribbons and sheets of paper.

The printers include a frame having a reference surface along which one side of a sheet of paper is to be fed in sliding contact therewith, the frame being positioned deeply inside of the printers. Differently sized sheets of paper, i.e., sheets of paper having different widths, can be fed along the reference surface because one side edge of the sheet of paper is always held in sliding contact with the reference surface. The reference surface is used as a reference for storing information to be printed in a print buffer. Any ink marks, to be used in the subsequent classification of stacked printed price tags into different groups, need to be applied to the side edge of the sheet of paper which contacts the reference surface.

However, since the classifying ink marks are positioned such that they cannot be visually recognized by the operator, the operator is required to take out the stacked price tags and reorient them in the opposite direction in order to confirm the classifying ink marks. Such a procedure is inefficient, time-consuming, and laborious.

SUMMARY OF THE INVENTION

It is therefore an object of the present invention to provide a stacker which is capable of sorting or classifying a stack of printed sheets of paper into different groups without any unsightly marks on side edges thereof, any waste of paper material, and any inefficient, time-consuming, and laborious procedure.

Another object of the present invention is to provide a stacker which can form a stack of printed sheets of paper, such as bar codes, while verifying the printed sheets of paper and either identifying any defective printed sheets of paper in the stack or rejecting them from the stack.

According to the present invention, there is provided a stacker comprising feed means for feeding separate sheets in a direction, stacking means for stacking the separate sheets in a normal position, and a sheet classifying mechanism for shifting a sheet into a position different from the normal position, upstream of the stacking means with respect to the direction.

According to the present invention, there is also provided a stacker comprising feed means for feeding separate sheets printed with bar codes in a direction, stacking means for stacking the separate sheets in a normal position, verifying means for verifying the bar codes on the separate sheets fed by the feed means, and means for either shifting a sheet with a bar code, which is verified as being defective by the verifying means, into a position different from the normal position while the sheet is being fed from the verifying means to the stacking means, or rejecting a sheet with a bar code, which is verified as being defective by the verifying means, from the sheets stacked by the stacking means.

Separate sheets of paper, which may be existing sheets of paper or successively cut from a continuous length of paper, are fed by the feed means, and stacked in the normal position by the stacking means. The sheet classifying mechanism can shift a sheet into the position different from the normal position upstream of the stacking means. Therefore, a first or final sheet belonging to each of successive jobs or batches of sheets can be stacked in the position different from the normal position, so that the first or final sheet may be used to classify the batch of stacked sheets.

Inasmuch as no classifying mark is applied to a side edge of each of the sheets, the sheets are sightly in appearance, and no paper material is wasted. Nevertheless, the stacked sheets can easily be classified into groups or batches of sheets, using the shifted sheets as classifying sheets. The classifying sheets in the stack of sheets can clearly be recognized by the operator as they are shifted from the normal position.

If a bar code printed on a sheet is found defective as a result of a verification process, it can be shifted into the position different from the normal position, so that it can clearly be identified by the operator for removal. Alternatively, the sheet with the defective bar code may be rejected so that it will not be stacked, and only those sheets with properly printed bar codes will be stacked by the stacking unit.

The above and other objects, features, and advantages of the invention will be apparent from the following detailed description which is to be read in conjunction with the accompanying drawings.

BRIEF DESCRIPTION OF THE DRAWINGS

FIG. 6 is a schematic side elevational view of a bar, code printer with a stacker according to a second embodiment of the present invention;

FIGS. 10(A) and 1(B) are plan and side elevational views, respectively, of still another sheet classifying mechanism.

DETAILED DESCRIPTION OF THE PREFERRED EMBODIMENTS

A stacker according to a first embodiment of the present invention will be described below with reference to FIGS. 1 through 5(A) and 5(B).

Figure 1:
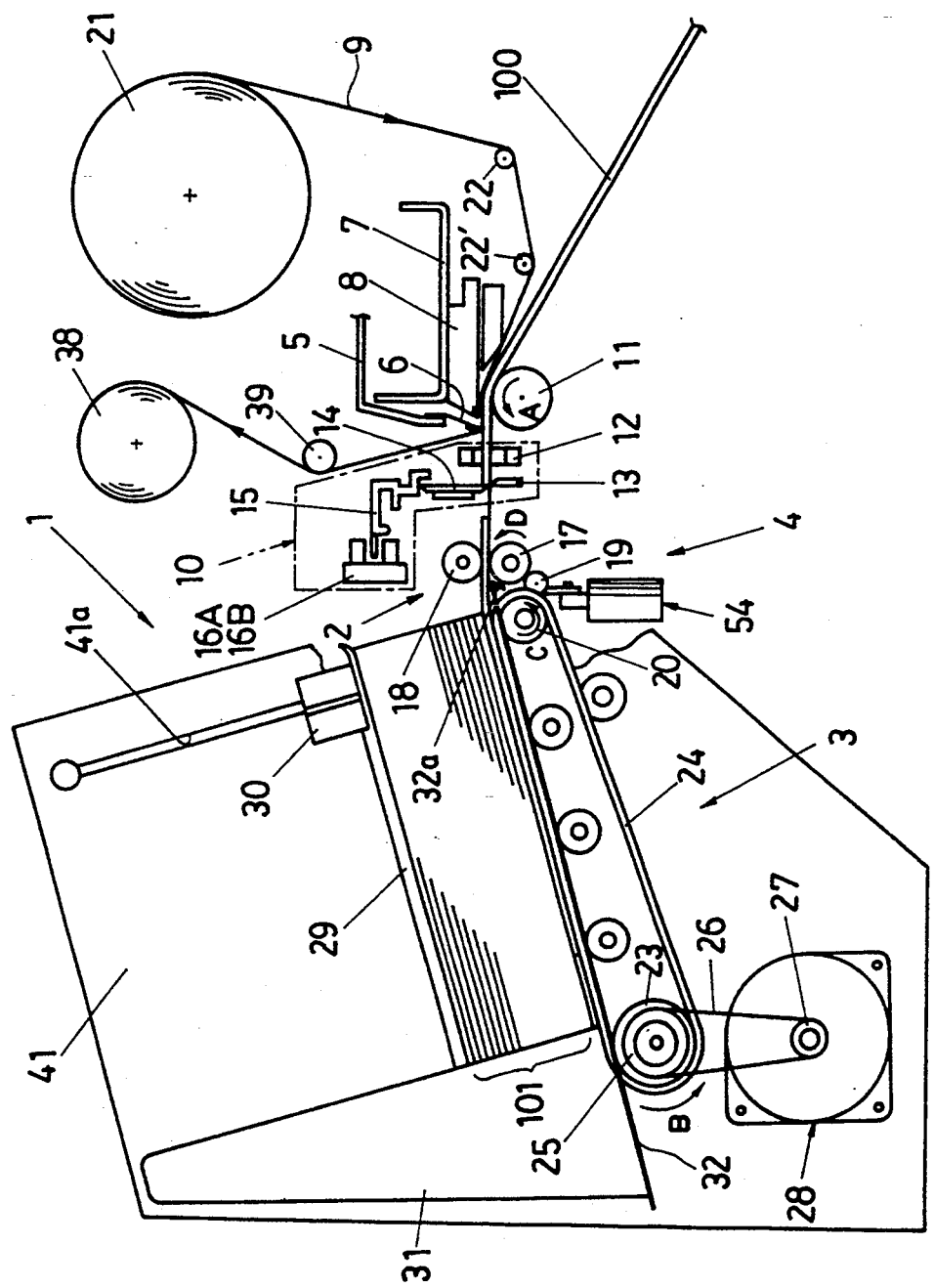
FIG. 1 is a schematic side elevational view of a printer with a stacker according to a first embodiment of the present invention.
Figures 4A, 4B:
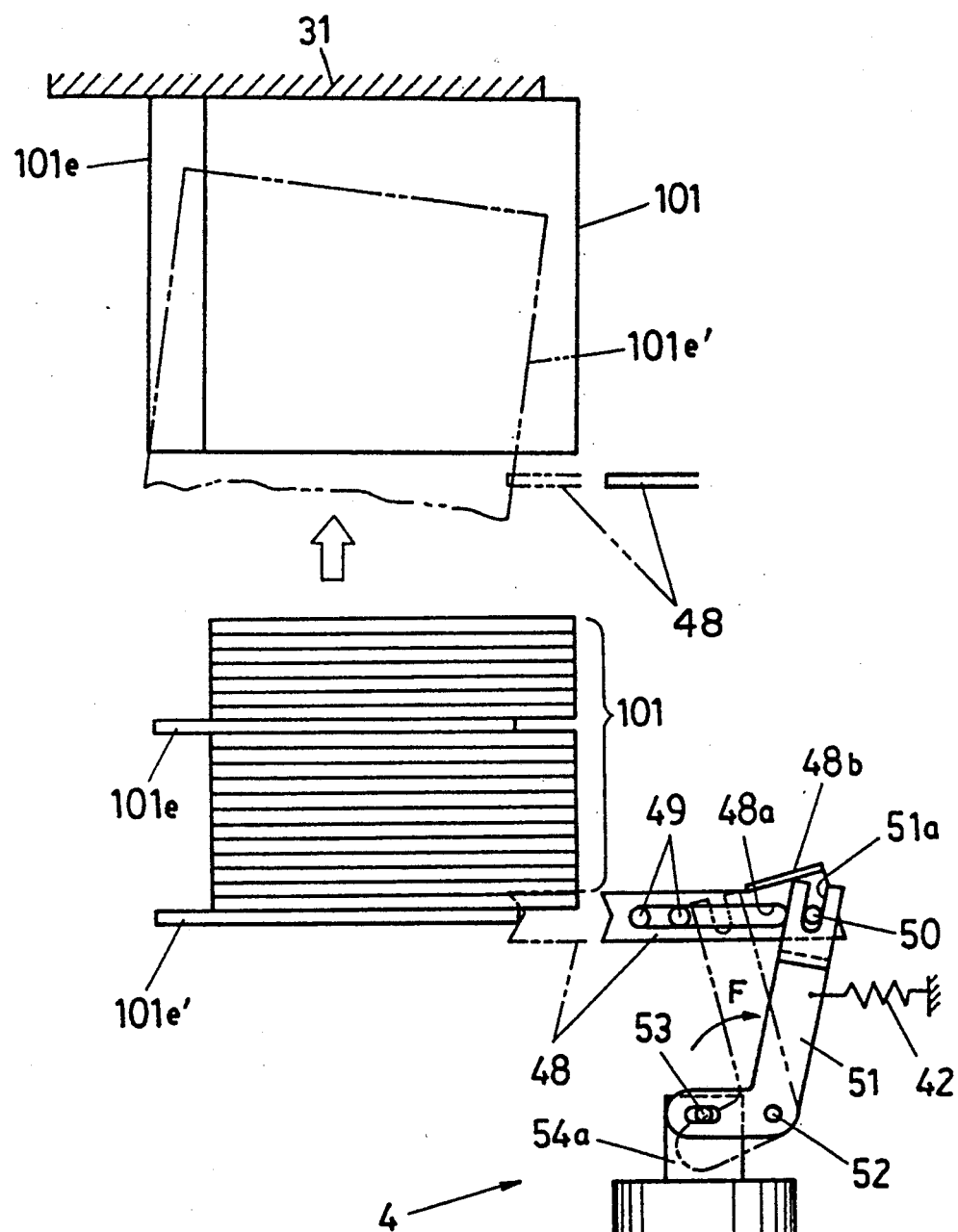
FIGS. 4(A) and 4(B) are plan and front elevational views, respectively, of a sheet classifying mechanism of the printer shown in FIG. 1.
Figure 5B:
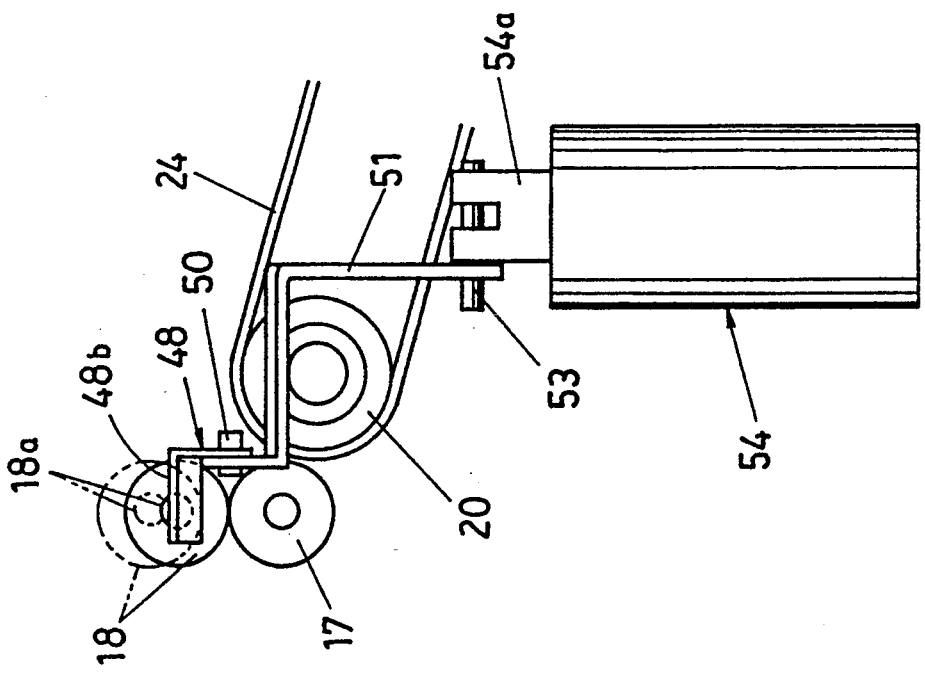
FIGS. 5(A) and 5(B) are front and side elevational views, respectively, showing the manner in which a pinch roller is released from pressing contact with a feed roller when the sheet classifying mechanism shifts a cut sheet of paper into a position different from a normal position.
Figure 5A:
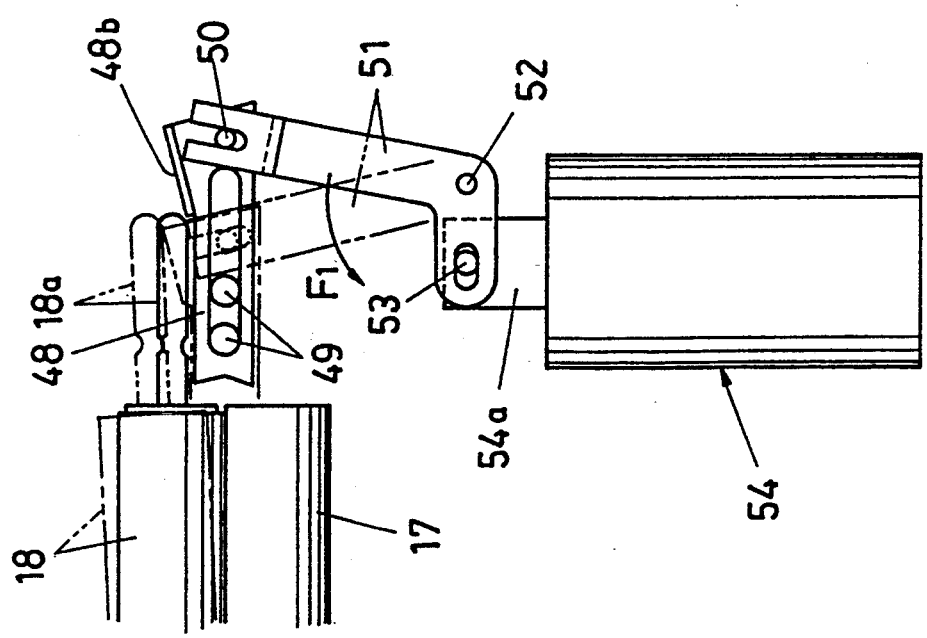

In FIG. 1, a printer such as a successive price tag printer is equipped with a stacker 1 according to the first embodiment of the present invention. The stacker 1 comprises a feed unit 2 for successively feeding sheets 101 of paper, for use as price tags, cut from a continuous length 100 of relatively thick paper, referred to as tag paper, a stacking unit 3 for stacking the sheets 101 fed by the feed unit 2 successively on a base plate 32 in a normal position thereon, and a sheet classifying mechanism 4 for shifting some of the sheets 101 into a position, indicated by the imaginary lines, different from a normal position indicated by the solid lines as shown in FIG. 4(A), the sheet classifying mechanism 4 being positioned upstream of the stacking unit 3 with respect to the direction in which the sheets 101 are fed along a feed path by the feed unit 2.

The printer has a cutter unit 10 disposed upstream of the stacker 1 and a thermal head 8 disposed upstream of the cutter unit 10.

The thermal head 8 comprises a linear array of thermal elements fixed to a lower surface of a thermal head support plate 7 and normally urged against a platen 11 by a pressure member (not shown) mounted on a head frame 5. The continuous length 100 of paper and a thermal transfer ribbon 9 are sandwiched between the thermal head 8 and the platen 11. While the platen 11 is being rotated about its own axis in the direction indicated by the arrow A, the thermal elements of the thermal head 8 are selectively heated based on print data supplied thereto for printing necessary information on the continuous length 100 of paper.

The platen 11 is continuously rotated to feed the continuous length 100 of paper as it is printed. The thermal transfer ribbon 9 is unwound from a supply roll 21 and guided around guide shafts 22, 22', and impressed on the upper surface of the continuous length 100 of paper by the thermal head 8. Then, the thermal transfer ribbon 9 is peeled off the continuous length 100 of paper by a ribbon peeling plate 6, guided around a guide shaft 39 and wound on a takeup roll 38.

The printed continuous length 100 of paper is delivered into the cutter unit 10. Based on a signal from a mark sensor 12 which detects a positional mark on the continuous length 100 of paper, a carriage 15 of the cutter unit 10 is moved in a direction normal to the sheet of FIG. 1, either away from or toward the viewer, with suitable timing for a predetermined sheet length, causing a fixed blade 13 and a rotary blade 14 mounted on the carriage 15 to cut off the continuous length 100 of paper into a sheet 101 of suitable length, as described in detail later on.

The carriage 15 may be actuated based on a signal from a transmissive or reflective sheet sensor (not shown) which is used to detect the position of the continuous length 100 of paper for controlling the thermal head 8.

The stacking unit 3 includes a motor 28 for moving an endless feed belt 24 in the direction indicated by the arrow B to feed the cut sheet 101 to a predetermined position on a slanted base plate 32, thereby stacking successive cut sheets 101 on the base plate 32.

More specifically, when the motor 28 is energized, a pulley 27 mounted on the output shaft of the motor 28 is rotated, causing a belt 26 trained therearound to rotate a pulley 25 that is positioned upwardly of the pulley 27 and also a drive pulley 23 coaxially connected to the pulley 25, in the direction indicated by the arrow B. Therefore, a feed belt 24 trained around the drive pulley 23 and a feed pulley 20 which is rotatably disposed near the feed unit 2.

The feed pulley 20 is supported on a shaft on which there is fixedly mounted a gear (not shown) that is held in mesh with an idle gear 19 meshing with a gear (not shown) that is rotatable in unison with the feed roller 17. Therefore, when the feed pulley 20 rotates in the direction indicated by the arrow C, the feed roller 17 rotates in the direction indicated by the arrow D. The feed roller 17, the associated gears, a pinch roller 18 disposed above the feed roller 17 and held in rolling contact therewith jointly serve as the feed unit 2.

A sheet 100 of paper cut by the cutter unit 10 is introduced into the feed unit 1 and fed to the left (FIG. 1) along the feed path while being sandwiched between the feed roller 17 and the pinch roller 18, until the sheet 101 is fully inserted below the stack of sheets 101 on the base plate 32 of the stacking unit 3.

When the trailing end of the sheet 101 leaves the feed roller 17 and the pinch roller 18, the sheet 101 is fed only by the feed belt 24 which travels in the direction indicated by the arrow B, until the leading end of the sheet 101 abuts against a stopper 31 on the base plate 32.

The stack of sheets 101 on the base plate 32 is normally urged downwardly against the base plate 32 by a holder 29 which contacts the uppermost sheet 101 of the stack. The holder 29 has a guide projection (not shown) slidably engaging in an oblique guide groove 41a defined in a side plate 41 and extending in a direction substantially normal to the stacked sheets 101. Therefore, while being limited in its movement by the guide groove 41a, the holder 29 is movable along the guide groove 41a into a position in which its own weight counterbalances the upward force applied by successively inserted sheets 101.

The holder 29 is effective to prevent the leading end of a newly inserted sheet 101, which may have been curled, from being directed upwardly after it has been engaged by the stopper 31.

The holder 29 has a knob 30 which may be gripped by the operator to move the holder 29 upwardly for removing the stacked sheets 101.

A guide member 32a is disposed on the righthand end (as viewed in FIG. 1) of the base plate 32 for preventing a sheet 101, which may be relatively thin, from being trapped by the feed roller 17.

The cutter unit 10 will be described in detail below with reference to FIGS. 2 and 3.

Figure 2:
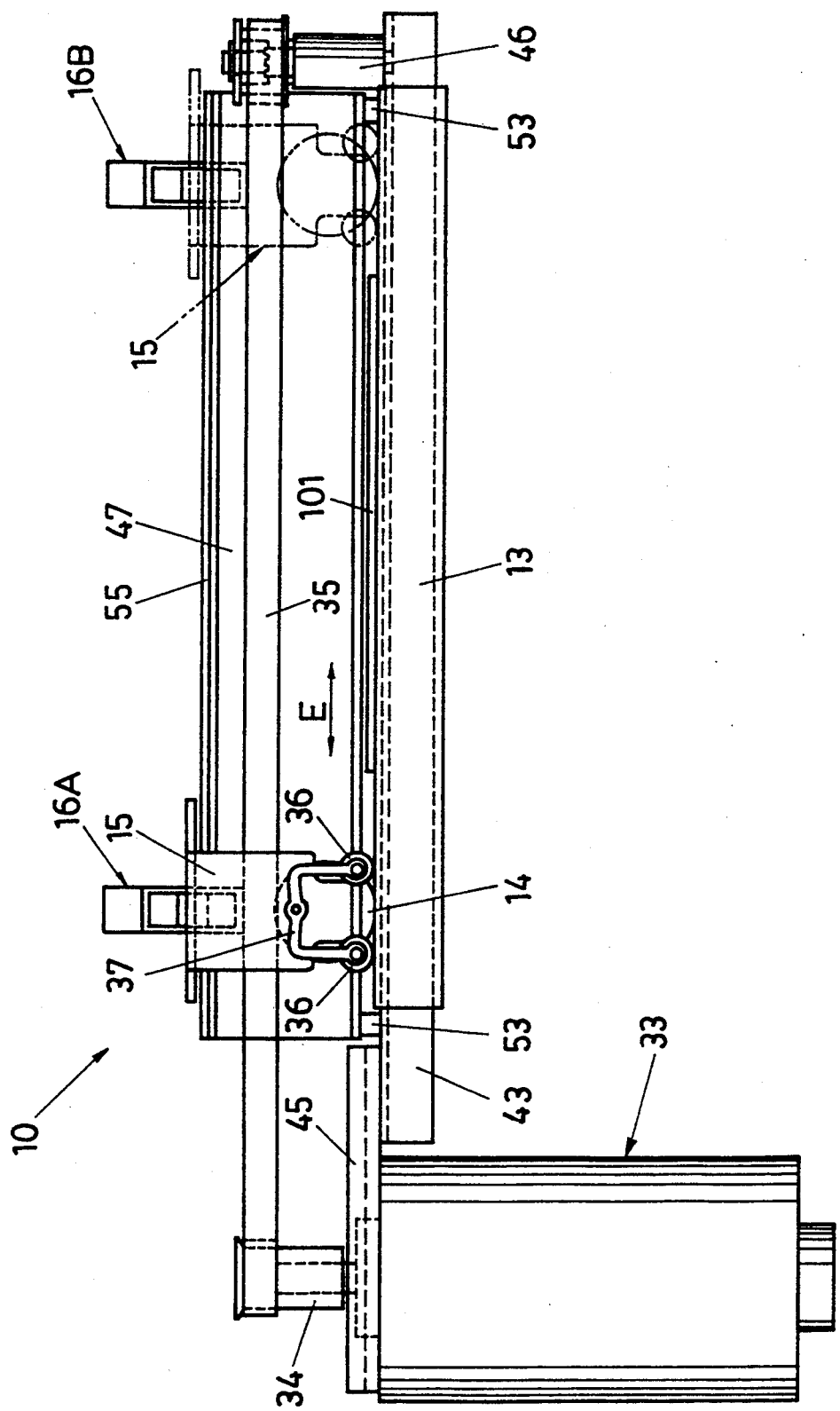
FIG. 2 is a front elevational view of a cutter unit of the printer shown in FIG. 1.
Figure 3:
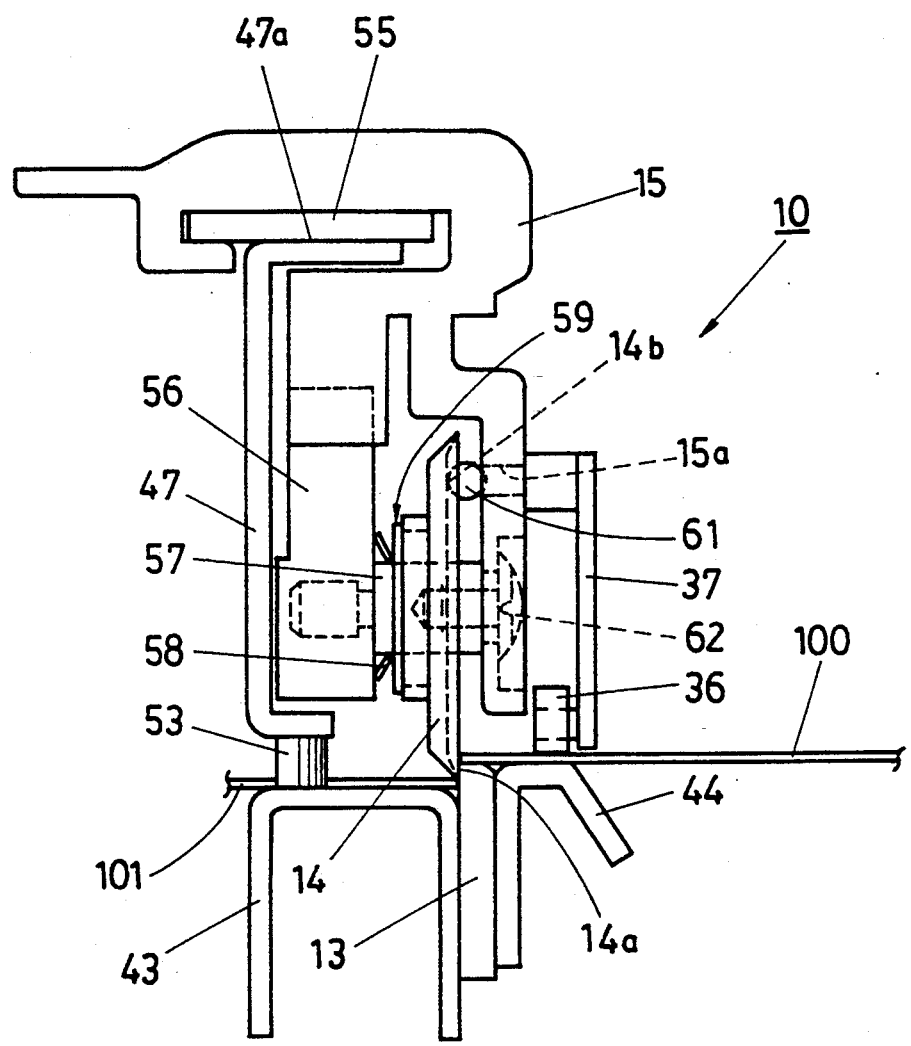
FIG. 3 is an enlarged side elevational view of the cutter unit.

As shown in FIGS. 2 and 3, the cutter unit 10 is supported on a printer frame (not shown) by a cutter bracket 43. The cutter bracket 43 supports thereon the fixed blade 13, a lower sheet guide 44, a motor bracket 45, and a driven pulley shaft 46. The cutter unit 10 also includes a cutter frame 47 fixedly mounted on the cutter bracket 43 by spacers 53.

As shown in FIG. 3, the cutter frame 47 is of a channel shape opening to the left, and a carriage guide 55 is securely disposed on an upper surface 47a of the cutter frame 47. The carriage 15 is slidably fitted over the carriage guide 55 for sliding movement alternately in the directions indicated by the arrow E in FIG. 2.

As shown in FIG. 3, a holder frame 56 is detachably mounted on the carriage 15, and the rotary blade 14 is rotatably supported on a shaft 57 fixed to the holder frame 56, by a flanged ball bearing 59 that is axially slidably fitted over the shaft 57. The flanged ball bearing 59 has a lefthand end engaged by a disc spring 58 that is fitted over the shaft 57 for normally urging the flanged ball bearing 59 to the right (FIG. 3).

The rotary blade 14 is thus urged by the flanged ball bearing 59 to have its lower end 14a pressed against the fixed blade 13. An upper end 14b of the rotary blade 14 is held in contact with a ball 61 that is partly fitted in a hole 15a defined in the carriage 15. The ball 61 prevents the rotary blade 14 from being unduly tilted out of a vertical plane due to engagement with the fixed blade 13. The ball 16 held in rolling contact with the rotary blade 14 is also effective to reduce the load imposed on the rotary blade 14 when it is rotated.

The carriage 15 is fastened to the holder frame 56 by a screw 62 that is threaded through a hole defined in the carriage 15 into the shaft 57 which is fixed to the holder frame 56.

To allow the rotary and fixed blades 14, 13 to cut a continuous sheet 100 of relatively thin paper reliably without the danger of the sheet 100 slipping away, two spaced sheet holder rolls 36 are rotatably supported on respective lower ends of a holder arm 37 (see FIG. 2) rockably supported on the carriage 15. The sheet holder rolls 36 serve to resiliently to hold the continuous sheet 100 against the lower sheet guide 44, as shown in FIG. 3.

The carriage 15 is fixed to a horizontal timing belt 35 which is trained around a driven pulley mounted on the driven pulley shaft 46 and a drive pulley 34 mounted on the output shaft of a cutter motor 33 that is supported on the motor bracket 45. The carriage 15 can be stopped by stoppers in either a position indicated by the solid lines in FIG. 2 or a position indicated by the imaginary lines in FIG. 2.

When the cutter motor 33 is energized, the timing belt 35 is actuated to move the carriage 15 between the solid-line position and the imaginary-line position for thereby enabling the rotary and fixed blades 14, 13 to cut off the continuous length 100 of paper into a sheet 101 of predetermined length, which is suitable for use as a price tag.

The cutter unit 10 also has two position sensors 16A, 16B located in the solid- and imaginary-line positions, respectively, for the carriage 15. Based on signals from the position sensors 16A, 16B, a main control unit 80 (see FIG. 7) determines the present position of the carriage 15 and the direction in which to move the carriage 15. If the carriage 15 is in the solid-line position, then the main control unit 80 controls the cutter motor 33 to move the carriage 15 to the imaginary-line position. Conversely, if the carriage 15 is in the imaginary-line position, then the main control unit 80 controls the cutter motor 33 to move the carriage 15 to the solid-line position.

Based on a signal from the mark sensor 12, the main control unit 80 stops the rotation of the platen 11 when the leading end of the continuous sheet 100 of paper is fed to a predetermined position. Then, in response to the signals from the position sensors 16A, 16B, the main control unit 80 moves the carriage 15 in one direction to cut off the continuous sheet 100 of paper. When the completion of the cutting of the continuous sheet 100 of paper is detected based on the signals from the position sensors 16A, 16B, the main control unit 80 resumes the feeding of the continuous sheet 100 of paper.

The sheet classifying mechanism 4 will be described below with reference to FIGS. 4(A), 4(B), 5(A), and 5(B). The sheet classifying mechanism 4 has a solenoid 54 affixed to a frame (not shown) of the stacking unit 3. As shown in FIG. 4(B), the solenoid 54 has a movable plunger 54a to which there is coupled by a pin 53 one end of a crank-shaped arm 51 that is angularly movable about a pivot shaft 52. The arm 51 has a U-shaped groove 51a defined in its other end which receives a pin 50 fixed to one end of a classifying bullet 48.

The classifying bullet 48 is in the form of a horizontally elongate plate having an elongate narrow guide hole 48a which receives two guide pins 49 fixed, by staking, to a guide plate (not shown) of the stacking unit 3. Therefore, the classifying bullet 48 is horizontally movable a certain stroke determined by the guide hole 48 and the guide pins 49.

The arm 51 is normally urged to turn clockwise about the pivot shaft 52 by a tension spring 42 engaging the arm 51 near the U-shaped groove 51a. When the solenoid 54 is de-energized, the plunger 54a projects outwardly, and the arm 51 is turned clockwise in the direction indicated by the arrow F about the pivot shaft 52 under the bias of the tension spring 42. The pin 50 and hence the classifying bullet 48 are moved to the right until the lefthand end of the guide hole 48a is engaged by the lefthand guide pin 49. Now, the classifying bullet 48 is in an initial position.

As described above, the continuous sheet 100 of paper is cut off into successive sheets 101 by the cutter unit 10, and the sheets 101 are successively stacked on the base plate 32. The main control unit 80 controls the printer to successively cut and stack sheets 101 until one job is done, i.e., a predetermined batch of stacked sheets 101 is produced. After one job is completed, a certain signal indicative of the completion of the job is applied to the main control unit 80, which determines that the batch of stacked sheets 101 is to be classified or sorted. The main control unit 80 now energizes the solenoid 54 to retract the plunger 54a.

When the plunger 54a is retracted, the arm 51 is turned counterclockwise to the position indicated by the imaginary lines in FIG. 4(B). At this time, a final cut sheet 101e' which belongs to the job or batch, is being fed toward the stopper 31 on the base plate 32 by the feed roller 17, the pinch roller 18, and the feed belt 24. The classifying bullet 48 moves to the left (FIG. 4(B)), pushing the sheet 101e' to the left in FIG. 4(B), or toward the viewer in FIG. 1, until the sheet 101e' is displaced from the proper stacked position as shown in FIG. 4(A).

As the sheet 101e' thus shifted is fed by the feed belt 24, the leading end of the sheet 101e' abuts against the stopper 31, and the sheet 101e' is angularly displaced thereby until finally it is laterally shifted from the properly stacked sheets 101, as indicated by 101e in FIG. 4(A) .

The classifying bullet 48 has a slanted surface 48a on its upper righthand portion (FIG. 4(B)) for releasing the sheet 101e' from the sandwiched engagement with the feed roller 17 and the pinch roller 18 (see FIG. 1) to facilitate the leftward shifting of the sheet 101e'. More specifically, when the arm 51 is turned counterclockwise in the direction indicated by the arrow F1 (FIG. 5(A)), the slanted surface 48b of the classifying bullet 48 lifts a shaft 48a of the pinch roller 18, thus elevating the pinch roller 18 away from the feed roller 17. Consequently, the sheet 101e' is released from the rollers 17, 18, and can easily be shifted by the classifying bullet 48.

Therefore, each time one job is completed, or one batch or group of stacked sheets 101 is produced, only the final sheet 101e of the job is laterally displaced from the other stacked sheets 101, as shown in FIG. 4(A). The laterally displaced sheet 101e can easily and clearly be recognized or distinguished from other properly stacked sheets. Accordingly, the batch of sheets 101 stacked over the laterally displaced final sheet 101e can easily be sorted out subsequently.

The sheet which is pushed sideways by the classifying bullet 48 may be a first sheet of each job or batch of sheets.

The printer with the stacker according to the first embodiment described above can be controlled by an electronic control system which is essentially the same as the electronic control system (see FIG. 7) of a bar code printer with a stacker according to a second embodiment of the present invention, described below, except for components relative to bar code verification.

A bar code printer with a stacker according to a second embodiment of the present invention will be described below with reference to FIGS. 6 and 7.

As shown in FIG. 6, the bar code printer is similar to the printer shown in FIG. 1 except for a bar code verification unit 72 disposed between the thermal head 8 and the cutter unit 10. Those parts shown in FIG. 6 which are identical to those shown in FIG. 1 are denoted by identical reference characters, and will not be described in detail.

In FIG. 6, a stacker 1 comprises a feed unit 2 for successively feeding sheets 101 of paper, for use as bar code sheets, cut from a continuous length 100 printed with successive bar codes, a stacking unit 3 for stacking the sheets 101 fed by the feed unit 2 successively on a base plate 32 in a normal position thereon, and a sheet classifying mechanism 4 for shifting those sheets 101 which are found defective by a bar code verification unit 72, into a position different from a normal position while they are being fed onto the base plate 32.

The bar code verification unit 72 has a scanner 73 for scanning and reading the printed bar codes on the continuous length 100 of paper in a direction to the direction in which it is fed, and verifying the printed bar codes.

If a printed bar code that is verified by the bar code verification unit 72 is found defective due to a void or spot which is highly likely to make the bar code unreadable, or due to too a thick or thin bar which is highly likely to cause a reading error, then the bar code verification unit 72 sends a signal to the main control unit 80, which then controls the thermal head 8 to print the bar code again on a next section of the continuous sheet 100 of paper.

The continuous sheet 100 of paper with a defective bar code printed thereon is cut off by the cutter unit 10 into a sheet 101 which carries such a defective bar code. The main control unit 80 produces a signal indicative of the defective bar code, and controls the sheet classifying mechanism 4 to shift the sheet 101 with the defective bar code out of a normal stacked position.

The sheet classifying mechanism 4 shown in FIG. 6 operates basically in the same manner as the sheet classifying mechanism 4 according to the first embodiment. However, the classifying bullet 48 may be movable a longer stroke because the sheet classifying mechanism 4 is required to reject or remove sheets 101 printed with defective bar codes, rather than sorting out those sheets 101 which belong to different batches or groups.

The solenoid 54 may be supplied with a higher voltage to move the classifying bullet 48 at a higher speed for moving sheets 101 printed with defective bar codes a larger distance than when they are simply sorted out.

If sheets 101 printed with defective bar codes are stacked together with sheets 101 printed with accepted bar codes, then those sheets 101 printed with defective bar codes can easily be removed because they are shifted from the normal stacked position and hence easily and clearly recognizable and accessible. However, the operator is required to manually remove those sheets 100 with defective bar codes. If an alarm such as a buzzer sound is issued each time a sheet 100 with a defective bar code is produced, then the operator is alerted for manual intervention each time such an alarm is generated.

To avoid the manual removal by the operator, sheets 101 with defective bar codes may be displaced a large distance from the normal stacked position until they fall off the base plate 32, so that they will be automatically removed from the stacking unit 3. In such a case, the operator is not required to manually remove sheets 101 with defective bar codes from the stack.

Figure 7:
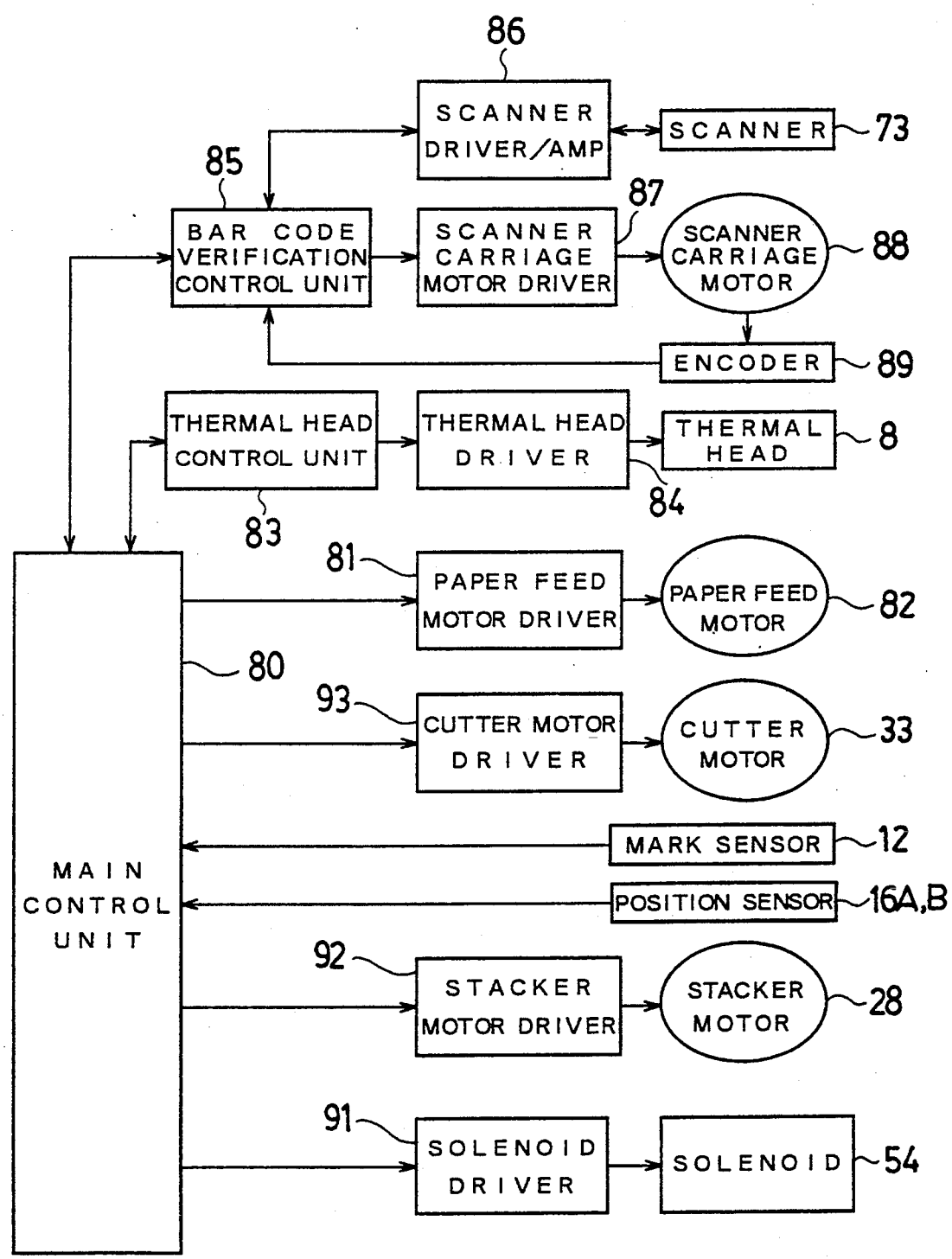
FIG. 7 is a block diagram of an electronic control system of the bar code printer shown in FIG. 6.

The electronic control system is shown in FIG. 7.

In FIG. 7, the main control unit 8 comprises a microcomputer having a CPU, a ROM, a RAM, etc. for controlling the entire operation of the bar code printer shown in FIG. 6.

The main control unit 80 controls a paper feed motor driver 81 to energize a paper feed motor 82, which comprises a step motor, to rotate the platen 11 for continuously feeding the continuous length 100 of paper to the left in FIG. 6. When a positional mark on the continuous length 100 of paper is detected by the transmissive or reflective sensor, the main control unit 80 can determine the position of the continuous length 100 of paper with respect to the thermal head 8 and the bar code verification unit 72 based on the signal from the transmissive or reflective sensor because the main control unit 80 stores data which represent steps of the paper feed motor 32 corresponding to printing and scanning positions spaced from the detected position.

Then, the main control unit 80 controls a thermal head control unit 83 to enable a thermal head driver 84 to energize the thermal head 8 with suitable timing, printing a bar code on the continuous length 100 of paper based on bar code data.

Thereafter, the main control unit 80 controls a bar code verification control unit 85 to enable a scanner driver/amplifier 86 to actuate a scanner 73 to read and verify a printed bar code on the continuous length 100 of paper. At this time, the bar code verification control unit 85 also enables a scanner carriage motor driver 87 to energize a scanner carriage motor 88 to move the scanner 73 in a direction normal to the feed path over an interval corresponding to the width of the continuous length 100 of paper. The movement of the scanner 73 is detected by an encoder 89, and fed back to the bar code verification control unit 85.

The bar code verification control unit 85 measures the number, thickness, and defects of bars or elements of the bar code read by the scanner 73 in relation to the signal from the encoder 89, and determines whether there are a number error, a thickness error, and a defect such as a void or spot with respect to the bar code. Then, the bar code verification control unit 85 sends the result of the verification to the main control unit 80.

Then, based on the signal from the mark sensor 12, the main control unit 80 controls a cutter motor driver 93 to energize the cutter motor 33 to move the carriage 15 for thereby cutting off the continuous length 100 of paper to a predetermined length as a bar code sheet. The direction in which to move the carriage 15 is determined by the main control unit 80 based on the signals from the position sensors 16A, 16B, as described above with reference to the first embodiment.

If the bar code verification unit 85 detects a bar code error or defect as a result of its verification process, the main control unit 80 controls a solenoid driver 91 to turn on the solenoid 54 to move the classifying bullet 48 for thereby displacing the bar code sheet with the bar code error or defect into a position different from the normal stacked position, as described above.

If the bar code verification unit 85 detects no bar code error or defect, then the main control unit 80 does not energize the solenoid 54, and controls a stacker motor driver 92 to energize the motor 28 for thereby actuating the feed belt 24 in the direction indicated by the arrow B (FIG. 6) to feed the sheet 101 to the normal stacked position on the base plate 32.

Figure 8A:
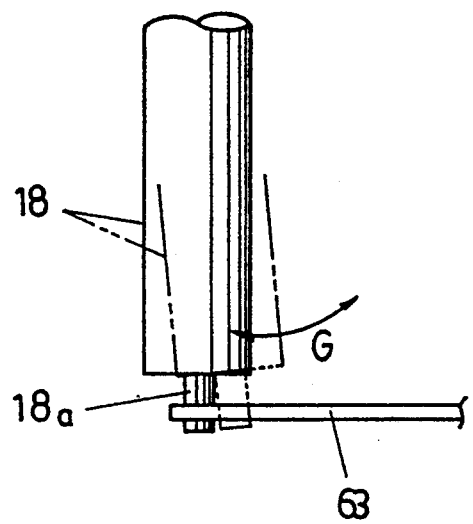
FIGS. 8(A) and 8(B) are plan and side elevational views, respectively, of another sheet classifying mechanism.
Figure 8B:
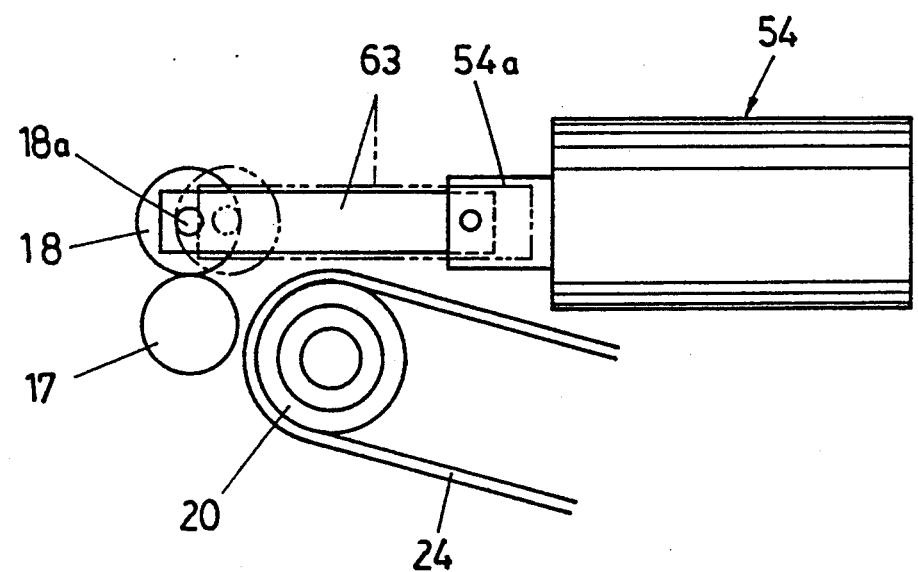

FIGS. 8(A) and 8(B) show another sheet classifying mechanism. Those parts shown in FIGS. 8(A) and 8(B) which are identical to those shown in FIGS. 4(A) and 4(B) are denoted by identical reference characters.

In FIGS. 8(A) and 8(B), when the solenoid 54 is energized, the pinch roller 18 is skewed with respect to the direction in which the cut sheet is fed, for tilting and laterally shifting a final sheet belonging to each job or batch.

More specifically, one end of the shaft 18a of the pinch roller 18 is connected to the plunger 54a of the solenoid 54 by an arm 63, and the shaft 18a is angularly movably supported at its other end (not shown) for angular movement in the directions indicated by the arrow G. When the solenoid 54 is energized, the plunger 54a is retracted to cause the arm 63 to tilt the pinch roller 18 from a normal position for feeding sheets, as indicated by the imaginary lines in FIGS. 8(A) and 8(B).

Figure 9:
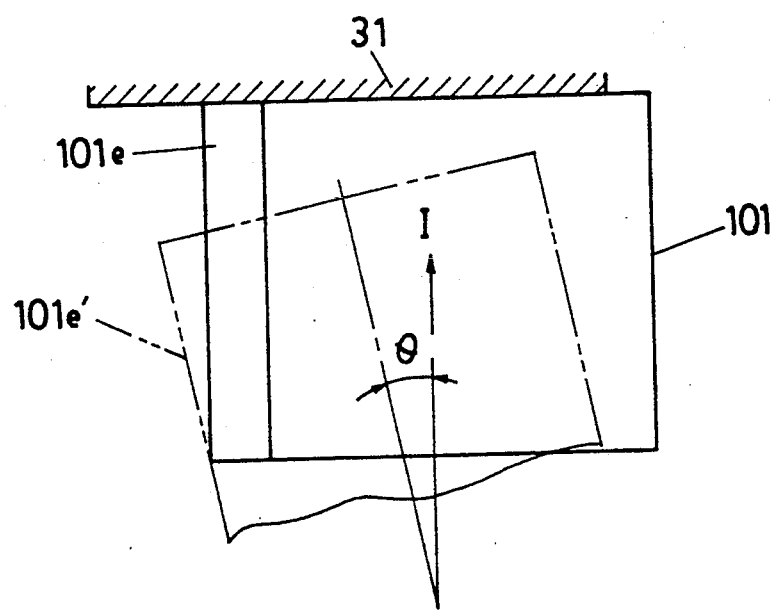
FIG. 9 is a plan view showing the manner in which a pinch roller is skewed by the sheet classifying mechanism shown in FIGS. 8(A) and 8(B) to stack a cut sheet of paper as being skewed relatively to a normal position.

When a final sheet 101e' of each job passes the pinch roller 18, the solenoid 54 is energized to tilt the pinch roller 18. Since the tilted pinch roller 18 feeds the sheet 101e' as tilted an angle θ (FIG. 9) with respect to the normal direction I in which cut sheets are fed, the sheet 101e' is laterally displaced with respect to other properly stacked sheets, as indicated at 101e in FIG. 9, when it is engaged by the stopper 31 and stacked on the base plate 32. Therefore, the sheet 101e thus laterally displaced can easily and clearly be recognized by the operator.

FIGS. 10(A) and 10(B) illustrate still another sheet classifying mechanism. Those parts shown in FIGS. 10(A) and 10(B) which are identical to those shown in FIGS. 4(A) and 4(B) are denoted by identical reference characters.

In FIGS. 10(A) and 10(B), when the solenoid 54 is energized, the feed roller 17 and the pinch roller 18 are axially shifted to laterally displace a final sheet belonging to each job or batch in a direction normal to the direction in which cut sheets are fed.

More specifically, the crank-shaped arm 51 which is pivotally supported by the pivot shaft 52 is angularly movably coupled by the pin 53 to the plunger 54a of the solenoid 54. The U-shaped groove 51a defined in the other end of the arm 51 receives a pin 64 fixed to and extending radially from one end of the shaft 18a of the pinch roller 18. When the solenoid 54 is energized, the plunger 54a is retracted to cause the arm 51 to turn in the direction indicated by the arrow F1 in FIG. 10(A). The shaft 18a then axially pushes the pinch roller 18 and also the feed roller 17, which is held in frictional engagement with the pinch roller 18, to a position indicated by the imaginary lines in FIG. 10(A).

When the pinch and feed rollers 18, 17 are thus axially moved while a final sheet belonging to each job or batch is being sandwiched therebetween, the sheet is laterally shifted with respect to the direction in which it is fed. After the laterally shifted sheet is stacked on the base plate, it can easily and clearly be distinguished from other properly stacked sheets by the operator.

The stacker according to the present invention is shown as being incorporated in a successive price tag printer or a bar code printer. However, the principles of the present invention are equally applicable to a stacker for stacking tickets, cards, or sheets in any of various ticket dispensers, card dispensers, or information reading devices with no printers, such as a bar code sheet reader, for reading information on cards or sheets, and also to a stacker with no cutter unit for stacking existing separate sheets, such as a card printer.

In the above embodiments, sheets that are handled by the stacker are of relatively thick paper referred to as tag paper. Therefore, the sheets can be pushed sideways by the classifying bullet actuated by the solenoid as shown in FIGS. 4(A) and 4(B). If sheets that are handled by the stacker are of relatively thick paper, such as slips, a gripping mechanism for gripping the sheets may be provided, and a sheet may be laterally displaced from a normal stacked position after it has been gripped by the gripping mechanism.

The sheets that are stacked by the stacker according to the present invention may be in the form of cards of plastics.

With the arrangement of the present invention, when separate sheets are stacked, desired ones of the separate sheets can be shifted into a position different from a normal stacked position so that they can easily and clearly be recognized so that stacked sheets can easily be divided or classified into different groups belonging to different jobs or batches. Since no classifying mark is applied to a side edge of a continuous length of paper, resultant cut sheets are sightly and no paper material is wasted. The sheet classifying mechanism is relatively simple in structure, and does not adversely affect the feeding of sheets.

If a bar code is not properly printed on a sheet in the bar code printer, then the sheet is stacked in a position in which it can easily be removed from the stack, or is automatically removed from the stack so that only those sheets which bear proper bar codes are stacked.

Having described illustrative embodiments of the invention with reference to the accompanying drawings, it is to be understood that the invention is not limited to such precise embodiments, and that various changes and modifications may be effected therein by one skilled in the art without departing from the scope and spirit of the invention as defined in the appended claims.

What is claimed is:

1. A stacker comprising:
feed means for feeding separate sheets along a feed path in a feeding direction;
stacking means for stacking sheets in a first position; and
a sheet classifying mechanism for shifting at least one sheet so that said stacking means moves said at least one sheet into a second position different from said first position, said sheet classifying mechanism disposed upstream of said stacking means with respect to said feeding direction, said classifying mechanism comprising a classifying bullet movable for pushing said at least one sheet;
wherein said classifying bullet is actuatable by a solenoid for moving said at least one sheet in a direction perpendicular to said feeding direction to shift the at least one sheet laterally from said feeding direction so that said stacking means stacks said at least one sheet into said second position different from said first position.

2. A stacker according to claim 1, wherein said sheet classifying mechanism comprises means for shifting a first or final sheet belonging to one batch of sheets into said second position different from said first position only when said first or final sheet is to be stacked by said stacking means.

3. A stacker according to claim 1, wherein said feed means comprises a feed roller and a pinch roller for feeding the separate sheets, one at a time, while sandwiching the separate sheets, said sheet classifying mechanism having means for temporarily releasing the sheet from sandwiched engagement between said feed roller and said pinch roller in response to the actuation of said classifying bullet.

4. A stacker according to claim 1, wherein said separate sheets are printed with bar codes; and
said classifying mechanism is a means for shifting at least one sheet with a bar code, which is verified as being defective, into said second position different from said first position.

5. A stacker according to claim 1, wherein said separate sheets are printed with bar codes; and
said classifying mechanism is a means for rejecting at least one sheet with a bar code, which is verified as being defective, from the sheets stacked by said stacking means.

6. A stacker comprising:
feed means for feeding separate sheets along a feed path in a feeding direction;
stacking means for stacking each sheet in a first position; and
a sheet classifying mechanism for shifting at least one sheet into a second position different from said first position, said sheet classifying mechanism disposed upstream of said stacking means with respect to said feeding direction;
said sheet classifying mechanism comprising a solenoid and a classifying bullet actuatable by said solenoid for moving said at least one sheet transversely to said feeding direction to shift the at least one sheet laterally from said feeding direction into said second position different from said first position;
and wherein said feed means comprises a feed roller and a pinch roller for feeding the separate sheets one at a time, while sandwiching the separate sheets, said sheet classifying mechanism having means for temporarily releasing the at least one sheet from sandwiched engagement between said feed roller and said pinch roller in response to the actuation of said classifying bullet.

* * * * *